(12) United States Patent
Raffenberg et al.

(10) Patent No.: US 6,401,672 B2
(45) Date of Patent: Jun. 11, 2002

(54) INTERNAL COMBUSTION ENGINE HAVING A CHOKE FLAP ARRANGED IN AN AIR FILTER HOUSING

(75) Inventors: Michael Raffenberg, Fellbach; Lars Bergmann, Welzheim; Heiko Rosskamp, Adelberg, all of (DE)

(73) Assignee: Andreas Stihl AG & Co., Waiblingen (DE)

( * ) Notice: Subject to any disclaimer, the term of this patent is extended or adjusted under 35 U.S.C. 154(b) by 0 days.

(21) Appl. No.: 09/795,389

(22) Filed: Mar. 1, 2001

(30) Foreign Application Priority Data

Mar. 1, 2000 (DE) .......................................... 100 09 796

(51) Int. Cl.[7] .............................................. F02M 1/02
(52) U.S. Cl. .................................. 123/73 A; 123/73 PP
(58) Field of Search ........................... 123/73 A, 73 C, 123/73 CA, 73 PP, 74 A, 74 AA, 74 B

(56) References Cited

U.S. PATENT DOCUMENTS

| | | | |
|---|---|---|---|
| 5,379,732 A | * | 1/1995 | Mavinahally et al. ... 123/73 AA |
| 6,216,650 B1 | * | 4/2001 | Noguchi ................... 123/73 A |
| 6,257,181 B1 | * | 7/2001 | Rosskamp et al. ....... 123/73 AA |
| 6,267,088 B1 | * | 7/2001 | Rosskamp et al. ....... 123/73 PP |

* cited by examiner

Primary Examiner—Marguerite McMahon
(74) Attorney, Agent, or Firm—Walter Ottesen

(57) ABSTRACT

The invention relates to a two-stroke engine in a portable handheld work apparatus. A combustion chamber (3) is formed in a cylinder (2) and the chamber is delimited by a piston (5). At least one transfer channel (14) is provided which connects the crankcase (4) to the combustion chamber (3). An air channel (22) opens into the transfer channel (14) and this channel supplies essentially fuel-free gas, preferably air. The intake channel (28) of a carburetor (8) is connected to an intake opening (45) in the housing base (41) of the air filter housing (43) upstream of a carburetor throttle flap. The intake channel (28) connects downstream of the carburetor throttle flap to an intake channel (9) to the crankcase (4). To provide an ignition-ready mixture in order to start and run up the engine, it is provided that the air channel (22) is connected to a bypass opening (25) in the housing base (41) of the air filter (42) and a common pivotable choke element (24) is assigned to the intake opening (45) as well as the bypass opening (25). The choke element (24) clears the openings (25, 45) in the operating position and closes the passthrough cross section of the bypass opening (25) in the start position whereas the passthrough cross section of the intake opening (45) is reduced to a start cross section.

15 Claims, 4 Drawing Sheets

INTERNAL COMBUSTION ENGINE HAVING A CHOKE FLAP ARRANGED IN AN AIR FILTER HOUSING

FIELD OF THE INVENTION

The invention relates to an internal combustion engine such as the drive motor of a portable handheld work apparatus including a motor-driven chain saw, a brushcutter, a cutoff machine or the like.

BACKGROUND OF THE INVENTION

In known two-stroke engines, a choke flap is mounted in the carburetor upstream of the throttle flap. The choke flap is closed except for a start cross section in the case of starting for enriching the mixture. In the start case, it should be simultaneously ensured that the throttle element mounted in the air channel closes completely so that no air can flow into the transfer channels via the air channels in the start case. This would lead to a leaning of the mixture and this makes the start of the engine more difficult and hinders a problem-free runup of the engine. For this reason, the throttle in the air channel must be set to a start position with a position-dependent coupling to the choke flap.

SUMMARY OF THE INVENTION

It is an object of the invention to improve an internal combustion engine of the kind referred to above so that well defined operating conditions are provided without leaning the mixture for part-air positions especially when starting the engine.

The internal combustion engine of the invention includes an engine in a portable handheld work apparatus. The internal combustion engine includes: a cylinder having a cylinder wall; a piston mounted in the cylinder to undergo a reciprocating movement along a stroke path between top dead center and bottom dead center during operation of the engine; the cylinder and the piston conjointly delimiting a combustion chamber; a crankcase connected to the cylinder; a crankshaft rotatably mounted in the crankcase; a connecting rod connecting the piston to the crankshaft to permit the piston to drive the crankshaft as the piston reciprocates in the cylinder; at least one transfer channel connecting the crankcase to the combustion chamber; the transfer channel having a first end defining an entry window opening into the combustion chamber and a second end opening into the crankcase; an air channel connected to the transfer channel for supplying an essentially fuel-free gas flow thereto; a carburetor for supplying an air/fuel mixture; the carburetor having an intake channel and a carburetor throttle flap; an inlet channel downstream of the carburetor flap for conducting the air/fuel mixture into the crankcase; an air filter having an air filter housing; the air filter housing having a base wall and the base wall having an intake opening formed therein; the intake channel being connected to the intake opening upstream of the carburetor throttle flap; the base wall also having a bypass opening formed therein and the air channel being connected to the bypass opening; a common choke element provided for the intake opening and the bypass opening; and, the choke element being displaceable between an operating position wherein the intake opening and the bypass opening are clear and a start position wherein the cross section of the intake opening is reduced to a start cross section and the bypass opening is essentially closed.

The arrangement of a common choke element for the intake opening of the carburetor as well as for the bypass opening of the air channel makes possible a simple switchover from the start position into the operating position. The bypass opening can be closed separately from the carburetor intake opening. If the choke flap is pivoted back into the operating position after starting, the intake opening and the bypass opening are preferably enabled sequentially so that a switchover of the engine from the start state into the operating state is provided without the problem of the engine stalling. According to the invention, the choke element is assigned to the bypass opening or intake opening and need not lie in the channel connected to the opening so that a closing of the bypass opening or intake opening is possible in a simple manner by overlapping. Accordingly, there is no need to maintain tight tolerances. The choke element can be pushed transversely to the channel as a blocking slider.

The choke element is advantageously arranged as an external component in the clean air space of the air filter and is there provided as an approximately flat slider approximately parallel to the base of the housing. A slider can be moved in a simple manner without complex mechanics and is especially pivotable about a rotational axis so that the constructive complexity for the configuration of the choke element and its actuation is minor.

The choke element can be made of plastic in a simple manner and especially be configured as a plastic injection-molded part and so becomes a series part which can be manufactured in mass production. This part nonetheless prevents the penetration of unwanted air into the bypass opening or intake opening. With an advantageous configuration as a flat slider parallel to the housing base of the air filter, an underpressure, which builds up in the intake channel of the carburetor or in the throttle channel of the air channel, pulls the slider onto the intake opening to thereby close this opening tightly. This is especially significant for the throttle channel of the bypass air. With the first ignitions, the engine runs up to idle rpm and a corresponding underpressure is built up in the air channel which could facilitate the inflow of unwanted air and therefore cause a leaning of the mixture. Because of the configuration of the choke element of the invention as a flat slider, the underpressure which builds up leads to the situation that the plate of the slider, which closes the bypass opening, is drawn by suction and lays seal-tight on the edge of the bypass opening. In this way, a penetration of unwanted air into the air channel is reliably prevented just at the time point of the runup of the engine so that a leaning of the mixture during runup of the two-stroke engine is avoided.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
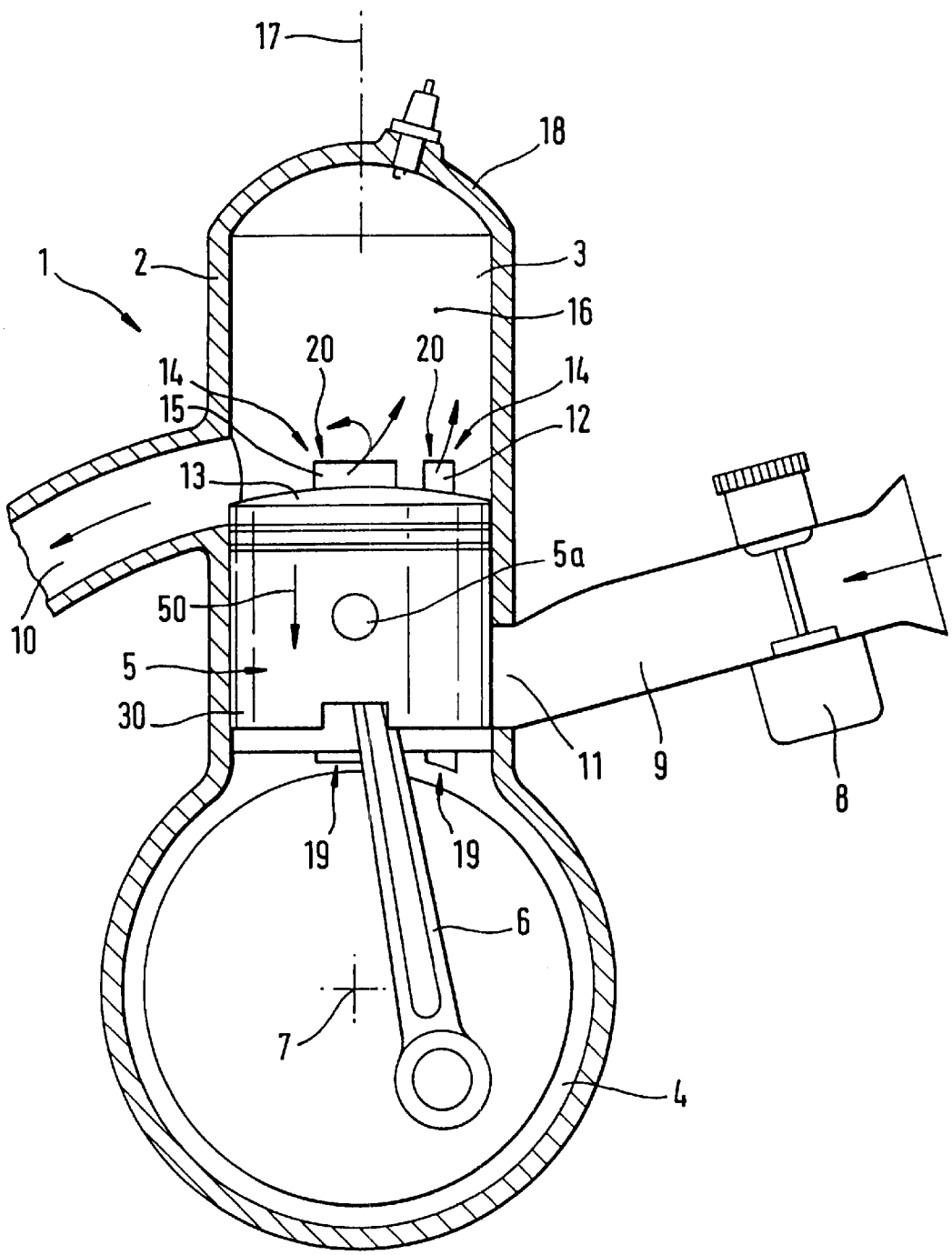
FIG. 1 is a schematic section through a two-stroke engine having transfer channels lying on opposite sides of a symmetrical plane of the cylinder.

The internal combustion engine shown in FIG. 1 is a two-stroke engine 1 and includes essentially a cylinder 2 and a piston 5 movable up and down in the cylinder. The piston 5 imparts rotational movement to a crankshaft 7 via a connecting rod 6. The crankshaft 7 is arranged in a crankcase 4. The piston 5 is held at the end of the connecting rod 6 by means of a piston bolt 5a to facilitate pivotal movement of the connecting rod.

A combustion chamber 3 is formed in the cylinder 2 and this chamber is delimited by the base 13 of the piston 5. The combustion chamber 3 includes an outlet 10 through which the combustion gases are directed away after a work stroke. The air/fuel mixture, which is needed to operate the engine 1, is supplied to the crankcase 4 from the carburetor 8 via an inlet 11 and an intake channel 9 connected thereto. The carburetor 8 is preferably a membrane carburetor.

In the embodiment shown, the inlet 11 is slot-controlled by the wall surface 30 of the piston 5. In the stroke position of the piston 5 shown in FIG. 1, the inlet 11 is completely closed by the piston wall surface 30. An alternative configuration of the inlet 11 as a membrane inlet can be practical.

Figure 2:
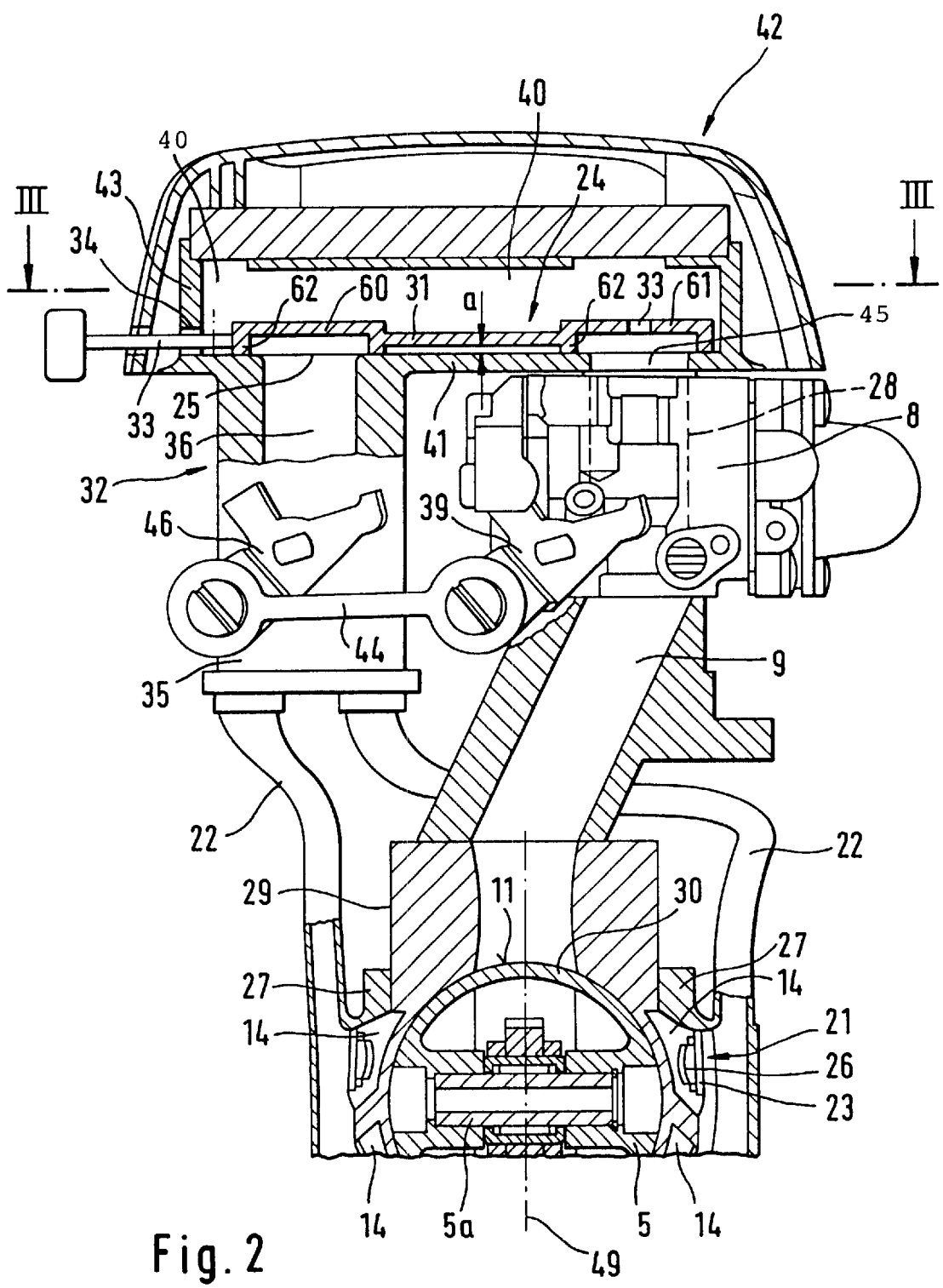
FIG. 2 is a schematic cross section through a cylinder of a two-stroke engine with an air filter mounted thereon.

The air/fuel mixture, which is already inducted into the crankcase 4, is compressed with a further movement of the piston 5 in the direction toward bottom dead center as indicated by arrow 50 and flows via the transfer channels 14 into the combustion chamber 3. As shown in FIG. 2, two transfer channels 14 are arranged on each side of a symmetry plane 49 of the cylinder 2. The symmetry plane 49 contains the cylinder axis 17 and partitions the outlet 10, that is, its outlet window, approximately symmetrically. The number of transfer channels 14 is only exemplary. n channels ($n \geq 2$) are possible.

The first ends 20 of the transfer channels 14 face toward the cylinder head 18. The ends 20 open into the combustion chamber 3, on the one hand, away or remote from the outlet 10 via an entry window 12 and, on the other hand, close to the outlet 10 via an entry window 15 in the cylinder wall 16; whereas, the second end 19 of each overflow channel 14 faces toward the crankcase and is open toward the crankcase 4. The transfer channels 14 are configured so as to be closed toward the piston 5 and run essentially parallel to the cylinder axis 17 in the cylinder wall 16. The transfer channel 14 can, however, also be curved in the flow direction or can even run in the manner of a screw thread which is a departure from the embodiment shown.

As shown in FIG. 2, external air channels 22 preferably open into the transfer channels 14. A check valve 21 is provided and closes the flow connection between the air channel 22 and the transfer channel 14 in each case. The check valve 21 opens into the transfer channel 14. In the embodiment shown, the check valve 21 is configured as a membrane valve. The membrane 23 clears an outlet slot in the open position and this outlet slot faces toward the roof (not shown) of the transfer channel 14. In the open position, the membrane 23 is held by a sheet metal support 26 which, together with a connecting piece 27 of the air channel 22, is fixed on the outer cylinder wall 29. In lieu of a membrane valve 21, the supply of fuel-free air or air having a low fuel content is also possible via a slot-controlled window in the cylinder wall 16 and, if required, via a peripheral slot in the skirt 30 of the piston.

The air channels 22 supply fluid, preferably air, which is free of fuel or has only slight amounts thereof. The air channels 22 are connected at the base of a throttle housing 35 which, in this embodiment, is fixed on the housing base wall 41 of an air filter housing 43 which is arranged upstream of the carburetor 8. The intake channel 28 of the carburetor 8 communicates with an intake opening 45 in the housing base 41 of the air filter 42 and draws combustion air from the clean space of the air filter 42.

The air channels 22 connect via the throttle channel 36 of the throttle housing 35 and a bypass opening 25 in the base 41 of the air filter housing 43 to the clean space of the air filter 42 so that dirt-free air is likewise supplied to the transfer channels 14 via the air channels 22.

Figure 3:
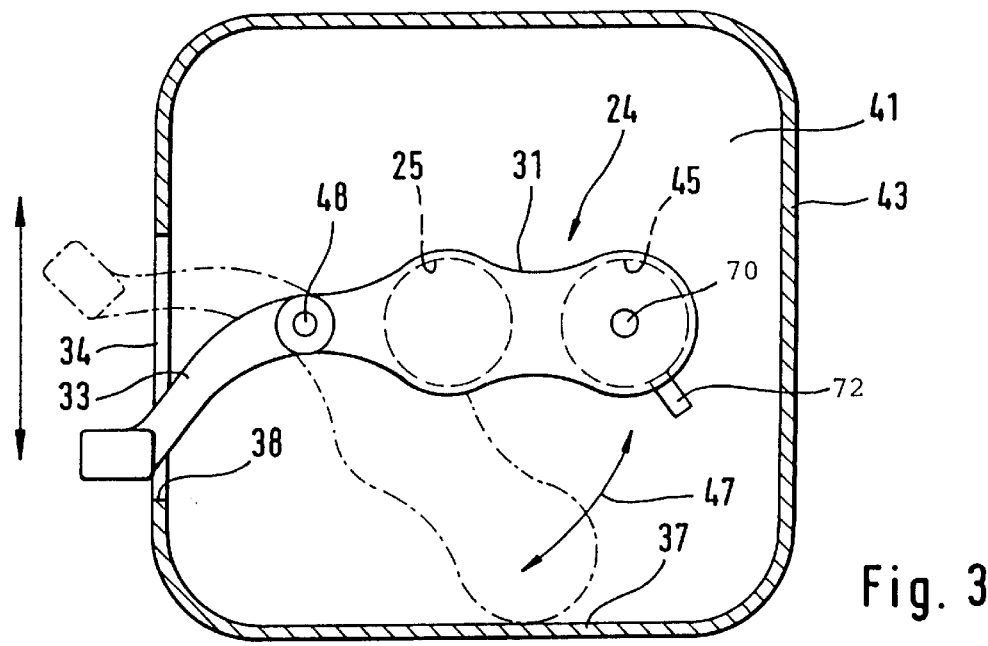
FIG. 3 is a section view taken through the air filter housing along line III—III of FIG. 2.

A common pivotable choke element 24 is assigned to the bypass opening 25 and the intake opening 45. The choke element 24 is configured essentially as a flat slider 31 and lies approximately parallel to the housing base 41. The choke element is adjustable about a pivot axis 41 in the direction of arrow 47 as shown in FIG. 3. The choke element 24 is shown in its first end position, the operating position, in FIG. 3 in phantom outline. In this position, the choke element clears the bypass opening 25 as well as the intake opening 45. The volumes of air, which flow through the intake channel 28 or the throttle channel 36, are adjusted by the throttle flaps which are adjustable in a manner known per se via throttle flap levers 39 and 46. In the embodiment, the throttle flap levers 39 and 46 are coupled position-dependent to each other via a connecting rod 44. A corresponding position of the air throttle flap in the throttle channel 36 is assigned to each position of the carburetor throttle flap.

In a second end position, the start position, the flat choke element lies across the element openings 25 and 45. In this way, the bypass opening 25 is completely and substantially closed air-tight whereas the transverse cross section of the intake opening 45 is reduced to a start cross section which is determined by an opening 70 in the choke element 24. In FIG. 3, the start position is shown by the solid line and the opening 33 lies approximately centrically to the intake opening 45. Other positions can be practical.

The choke element 24 is assigned to the carburetor 8 and the throttle 32 of the air channels 22. In the embodiment shown, the choke element 24 is arranged in the air filter housing 43 and preferably in the clean space 40 of the air filter 42. The actuation of the choke element 24 takes place via an actuation lever 33 which is lead to the outside through a slot 34 in the lateral housing wall of the air filter housing 43. The slider 31 can be manually displaced about the rotational axis 48 from the one end position (shown in phantom outline) into the other end position (shown by solid lines). The choke element 24 is advantageously manufactured of plastic as one piece with the actuating lever 33 and is especially configured as a plastic injection-molded part.

The end positions of the choke element 24 can be determined by housing stops. A first housing stop is determined for the operating position by the housing side wall 37 of the air filter housing 43 and the other housing stop is defined by the boundary edge 38 of the slot 34.

The choke element 24 shown in FIG. 3 is shown in FIG. 2 in cross section. The choke element 24 comprises essentially two cup-shaped cover plates 60 and 61 which are positioned in the start position (solid line) shown in FIG. 3 in front of the openings 25 and 45. The diameters of the cup-shaped cover plates are configured to be greater than the diameters of the openings 25 and 45 so that the plate edge 62 lies approximately seal-tight against the housing base 41 of the air filter housing 43. The base body of the slider 31 lies at a spacing (a) to the housing base 41 whereby a pivot movement in the direction of arrow 47 is possible without an application of much force.

The cup-shaped cover plate ensures the desired seal-tight covering of the intake openings 25 and 45 even under unfavorable operating conditions. In the operation of the two-stroke engine 1, an underpressure builds up in the throttle channel 36 of the throttle 32 as well as in the intake channel 28 of the carburetor 8 and, because of the action of the underpressure, the cup-shaped cover plates 60 and 61 are drawn so that their edges 62 lie seal-tight against the housing base 41. In this way, the start cross section, which is pregiven constructively by the opening 70, is effective without unwanted air entering which could have lead to a leaning of the start mixture and therefore to start difficulties. As an alternative to opening 70, the start cross section can also be provided by a slot 72 in the housing base 41. The slot 72 is only partially covered in the closed position of the choke element 24 and defines a flow path into the covered bypass opening 45.

Figure 4:
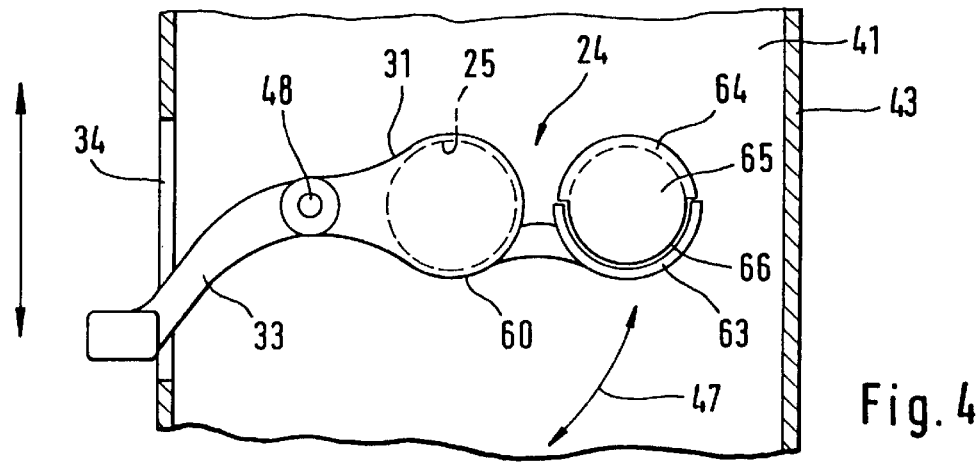
FIG. 4 is a detailed section view of an air filter housing of another embodiment with the view corresponding to that of FIG. 3.
Figure 5:
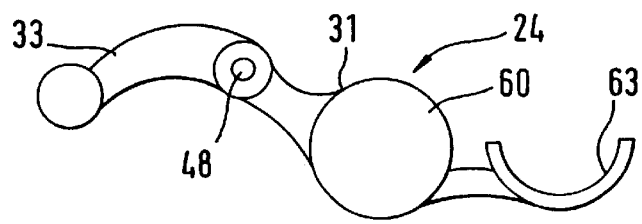
FIG. 5 is a plan view of a throttle flap for use in an air filter housing of FIG. 4; and, FIG. 6 is a schematic section through a carburetor with a one-piece formed-on bypass and throttle.

In an alternate embodiment of FIGS. 4 and 5, the choke element 24 is formed from a cup-shaped cover plate 60 for the air-tight closure of the bypass opening 25 and a half-ring-shaped closure element 63 which, together with a part ring section 64 defines a complete ring when the choke element 24 is in the start position shown in FIG. 4. The part ring section 64 is formed on the edge of the intake opening 45. The part ring section 64 holds a baffle plate 65 at an axial spacing forward of the intake opening 45 on the air filter housing base 41. In the end position shown in FIG. 4, that is, the start position, the half-ring-shaped closure element 63 of the choke element 24 and the baffle plate 65 conjointly delimit an intake slot 66. The intake slot 66 defines the start cross section of the intake opening 45. The part ring section 64 is formed on the housing base 41 to hold the baffle plate 65 and serves simultaneously as the end stop for the start position of the choke element 24.

Figure 6:
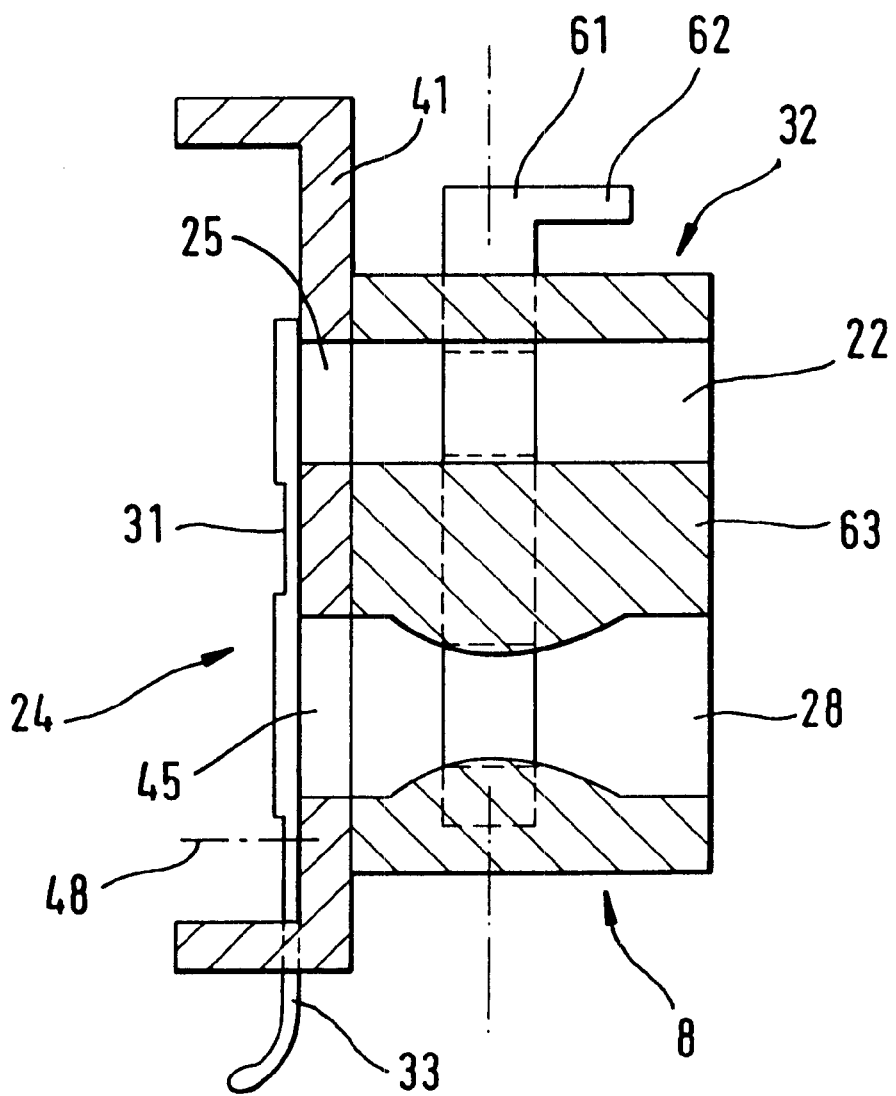

In the embodiment of FIG. 6, the carburetor 8 and the bypass throttle 32 are provided in a common housing 63. The intake channel 28 and the bypass channel 22 lie approximately parallel to each other and open separately to the clean space 40 of the air filter 42. It is practical to provide the common choke element configured especially as a cylinder 61 which is adjusted by an actuating lever 62.

It is understood that the foregoing description is that of the preferred embodiments of the invention and that various changes and modifications may be made thereto without departing from the spirit and scope of the invention as defined in the appended claims.

What is claimed is:

1. An internal combustion engine including an engine in a portable handheld work apparatus, the internal combustion engine comprising:

a cylinder having a cylinder wall;

a piston mounted in said cylinder to undergo a reciprocating movement along a stroke path between top dead center and bottom dead center during operation of said engine;

said cylinder and said piston conjointly delimiting a combustion chamber;

a crankcase connected to said cylinder;

a crankshaft rotatably mounted in said crankcase;

a connecting rod connecting said piston to said crankshaft to permit said piston to drive said crankshaft as said piston reciprocates in said cylinder;

at least one transfer channel connecting said crankcase to said combustion chamber;

said transfer channel having a first end defining an entry window opening into said combustion chamber and a second end opening into said crankcase;

an air channel connected to said transfer channel for supplying an essentially fuel-free gas flow thereto;

a carburetor for supplying an air/fuel mixture;

said carburetor having an intake channel and a carburetor throttle flap;

an inlet channel downstream of said carburetor flap for conducting said air/fuel mixture into said crankcase;

an air filter having an air filter housing;

said air filter housing having a base wall and said base wall having an intake opening formed therein;

said intake channel being connected to said intake opening upstream of said carburetor throttle flap;

said base wall also having a bypass opening formed therein and said air channel being connected to said bypass opening;

a common choke element provided for said intake opening and said bypass opening; and, said choke element being displaceable between an operating position wherein said intake opening and said bypass opening are clear and a start position wherein the cross section of said intake opening is reduced to a start cross section and said bypass opening is essentially closed.

2. The engine of claim 1, wherein said choke element is displaceable to an intermediate position between said operating position and said start position wherein said intake opening is essentially open and said bypass opening is essentially closed.

3. The engine of claim 1, said air filter housing defining a clean air space and said choke element being mounted in said clean air space.

4. The engine of claim 3, wherein said choke element is configured as a flat slider and lies approximately parallel to said base wall of said air filter housing.

5. The engine of claim 4, wherein said choke element is pivotable about a rotational axis.

6. The engine of claim 1, wherein said choke element includes an actuating lever extending out of said air filter housing to facilitate manual movement of said choke element between said operating position and said start position.

7. The engine of claim 1, wherein said choke element is made of plastic.

8. The engine of claim 7, wherein said choke element is a plastic injection molded part.

9. The engine of claim 3, wherein said air filter housing has stops formed therein to define said operating position and said start position.

10. The engine of claim 1, wherein said start cross section of said intake channel is defined by an opening in said choke element.

11. The engine of claim 1, wherein said start cross section is defined by a notch or slot in said base wall of said air filter housing.

12. The engine of claim 1, further comprising a cover part formed on said base wall of said air filter housing; said choke element including a closure part; and, said cover part and said closure part conjointly forming a slot defining a start cross section when said choke element is in said start position.

13. The engine of claim 12, wherein said cover part includes: a part-ring baffle plate held by said part-ring segment at an axial spacing in front of said intake opening;

and, said closure part being a part-ring segment which forms a full ring with said part-ring segment formed on said base wall when said choke element is in said start position with said part-ring segment of said choke element and said baffle plate conjointly defining said start cross section.

14. The engine of claim 1, further comprising a throttle device having an adjustable air throttle element; said air channel being connected to said base wall of said air filter housing via said throttle device; and, said throttle device including a throttle housing attached to said air filter housing and said air throttle element being mounted in said throttle housing.

15. The engine of claim 14, further comprising a lever transmission for position-dependently coupling said air throttle element and said carburetor throttle flap to each other.

* * * * *